United States Patent
Caddell et al.

(10) Patent No.: US 6,793,457 B2
(45) Date of Patent: Sep. 21, 2004

(54) FABRICATED REPAIR OF CAST NOZZLE

(75) Inventors: James Walter Caddell, Milford, OH (US); Matthew Nicklus Miller, Maineville, OH (US); Brian Alan Norton, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/295,185

(22) Filed: Nov. 15, 2002

(65) Prior Publication Data

US 2004/0096322 A1 May 20, 2004

(51) Int. Cl.⁷ .................................................. F01D 9/04
(52) U.S. Cl. .................................................. 415/209.4
(58) Field of Search ........................ 415/209.4, 210.1, 415/115, 116, 191; 29/889.22, 889.1; 416/193 A, 195

(56) References Cited

U.S. PATENT DOCUMENTS

| | | |
|---|---|---|
| 3,802,046 A | 4/1974 | Wachtell et al. |
| 4,305,697 A | 12/1981 | Cohen et al. |
| 4,326,833 A | 4/1982 | Zelahy et al. |
| 5,269,057 A | 12/1993 | Mendham |
| 5,272,809 A | 12/1993 | Robertson et al. |
| 5,690,469 A | 11/1997 | Deal et al. |
| 5,758,416 A | 6/1998 | Reverman et al. |
| 5,797,725 A | 8/1998 | Rhodes |
| 5,813,832 A | 9/1998 | Rasch et al. |
| 6,154,959 A | 12/2000 | Goodwater et al. |
| 6,173,491 B1 | 1/2001 | Goodwater et al. |
| 6,183,192 B1 | 2/2001 | Tressler et al. |
| 6,416,278 B1 | 7/2002 | Caddell, Jr. et al. |

*Primary Examiner*—Edward K. Look
*Assistant Examiner*—Kimya N McCoy
(74) *Attorney, Agent, or Firm*—David Narciso; Pierce Atwood (57) ABSTRACT

A method for repairing a turbine nozzle segment having at least one vane disposed between outer and inner bands includes separating the inner band from the nozzle segment, and joining the inner band to a newly manufactured replacement casting having an outer band and at least one vane. The replacement casting includes a mounting platform formed on one end of the vane and a boss formed on the mounting platform. A collar is joined to the inner band and has a slot formed therein. The boss is then inserted into the slot, and the mounting platform is received in a recess formed in the inner band. Joining is completed by joining the boss to the collar and the mounting platform to the inner band. The thickness of the collar is tapered in an axial direction, and a relief is formed in the collar to provide assembly clearance with adjacent components.

34 Claims, 9 Drawing Sheets

FABRICATED REPAIR OF CAST NOZZLE

BACKGROUND OF THE INVENTION

This invention relates generally to gas turbine engines and more particularly to the repair of turbine nozzle segments used in such engines.

A gas turbine engine includes a compressor that provides pressurized air to a combustor wherein the air is mixed with fuel and ignited for generating hot combustion gases. These gases flow downstream to a turbine section that extracts energy therefrom to power the compressor and provide useful work such as powering an aircraft in flight. Aircraft engines typically include stationary turbine nozzles that enhance engine performance by appropriately influencing gas flow and pressure within the turbine section. In multi-stage turbine sections, turbine nozzles are placed at the entrance of each turbine stage to channel combustion gases into the turbine rotor located downstream of the nozzle. Turbine nozzles are typically segmented around the circumference thereof with each nozzle segment having one or more vanes disposed between inner and outer bands that define the radial flowpath boundaries for the hot combustion gases flowing through the nozzle. These nozzle segments are mounted to the engine casing to form an annular array with the vanes extending radially between the rotor blades of adjacent turbine stages.

Various approaches have been proposed for manufacturing nozzle segments. In one common approach, the nozzle segment is a multi-piece assembly comprising an inner band, an outer band and one or more vanes, each of which is individually cast. Both the inner and outer bands are provided with slots into which the ends of the vanes are brazed in place to form the nozzle segment assembly. Another common approach is to integrally cast the nozzle segment. That is, the vanes, inner band and outer band are all formed together as an integral, one-piece casting.

Both approaches have advantages and disadvantages. For instance, one drawback to the multi-piece approach arises from the fact that nozzle segments are ordinarily mounted to the engine casing at the outer band only, with the vanes and inner band being essentially cantilevered into the hot gas stream. Consequently, the highest mechanical stresses in the nozzle segment occur at the vane-to-outer band interface, which in a multi-piece assembly is a braze joint whose strength is generally inferior to that of an integrally cast interface. The multi-piece nozzle segment can also be more expensive to produce. Thus, many nozzle segments are integrally cast.

Nozzle segments are exposed during operation to a high temperature, corrosive gas stream that limits the effective service life of these components. Accordingly, nozzle segments are typically fabricated from high temperature cobalt or nickel-based superalloys and are often coated with corrosion and/or heat resistant materials. Furthermore, nozzle segments are ordinarily cooled internally with cooling air extracted from the compressor to prolong service life. Even with such efforts, portions of the nozzle segments, particularly the vanes, can become cracked, corroded, and otherwise damaged such that the nozzle segments must be either repaired or replaced to maintain safe, efficient engine operation. Because nozzle segments are complex in design, are made of relatively expensive materials, and are expensive to manufacture, it is generally more desirable to repair them whenever possible.

Existing repair processes include techniques such as crack repair and dimensional restoration of airfoil surfaces. However, such existing repairs are limited by local distortion and under minimum wall thicknesses, which are exceeded as a result of repeated repair and chemical stripping processes. Thus, nozzle segments may become damaged to the point where they cannot be repaired by known repair processes. The thermal and mechanical stresses in integrally cast nozzle segments are such that it often occurs that the inner band is repairable while other nozzle segment structure is non-repairable. Thus, to avoid scrapping the entire nozzle segment in such a situation, it would be desirable to have a method for salvaging the repairable portion of the nozzle segment.

BRIEF SUMMARY OF THE INVENTION

The above-mentioned need is met by the present invention, which provides a method for repairing a turbine nozzle segment having at least one vane disposed between outer and inner bands. The method includes separating the inner band from the nozzle segment, and joining the inner band to a newly manufactured replacement casting having an outer band and at least one vane. The replacement casting includes a mounting platform formed on one end of the vane and a boss formed on the mounting platform. A collar is joined to the inner band and has a slot formed therein. The boss is then inserted into the slot, and the mounting platform is received in a recess formed in the inner band. Joining is completed by joining the boss to the collar and the mounting platform to the inner band. The thickness of the collar is tapered in an axial direction, and a relief is formed in the collar to provide assembly clearance with adjacent components.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
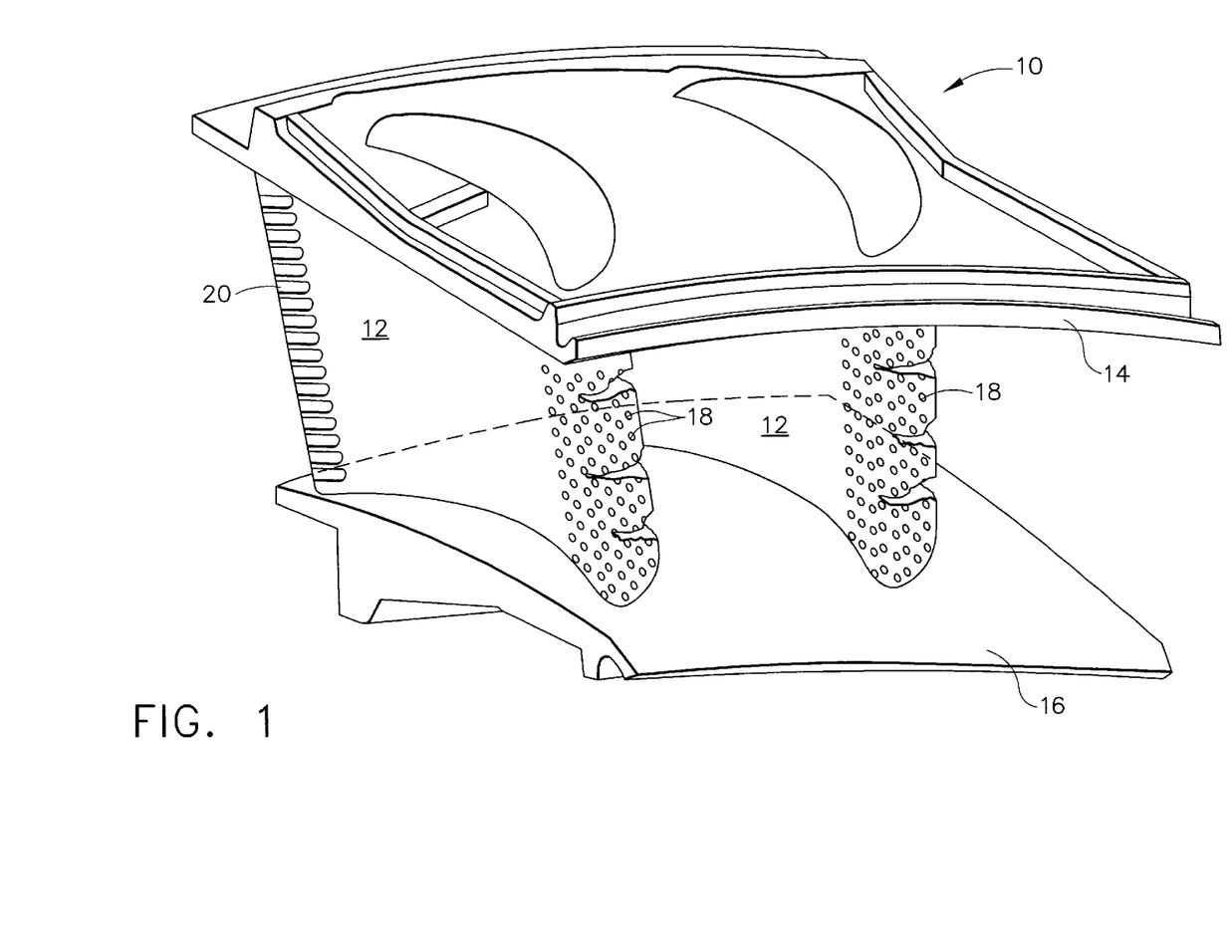
FIG. 1 is a perspective view of an engine run turbine nozzle segment.

Referring to the drawings wherein identical reference numerals denote the same elements throughout the various views, FIG. 1 shows a turbine nozzle segment 10 having first and second nozzle vanes 12. The vanes 12 are disposed between an arcuate outer band 14 and an arcuate inner band 16. The vanes 12 define airfoils configured so as to optimally direct the combustion gases to a turbine rotor (not shown) located downstream thereof. The outer and inner bands 14 and 16 define the outer and inner radial boundaries, respectively, of the gas flow through the nozzle segment 10. The vanes 12 can have a plurality of conventional cooling holes 18 and trailing edge slots 20 formed therein. Cooling holes are most typically used with first stage nozzle segments; later stage nozzle segments ordinarily do not utilize such cooling holes. The nozzle segment 10 is preferably made of a high quality superalloy, such as a cobalt or nickel-based superalloy, and may be coated with a corrosion resistant material and/or a thermal barrier coating. A gas turbine engine will include a plurality of such segments 10 arranged circumferentially in an annular configuration. While the repair methods of the present invention are described herein with respect to a two-vane nozzle segment, it should be recognized that the present invention is equally applicable to nozzle segments having any number of vanes.

During engine operation, the nozzle segment 10 can experience damage such as might result from local gas stream over-temperature or foreign objects impacting thereon. As mentioned above, a portion of the nozzle segment 10 may become damaged to the point where it cannot be repaired by known repair processes. The present invention is directed to a method of repairing a nozzle segment in which the inner band is repairable while other nozzle segment structure is non-repairable. By way of example, the vanes 12 are shown in FIG. 1 as having extensive damage such as to be non-repairable while the inner band 16 has relatively minor damage and is repairable. The present invention is most applicable to integrally cast nozzle segments, but could be used with other types of nozzle segments as well.

Figure 2:
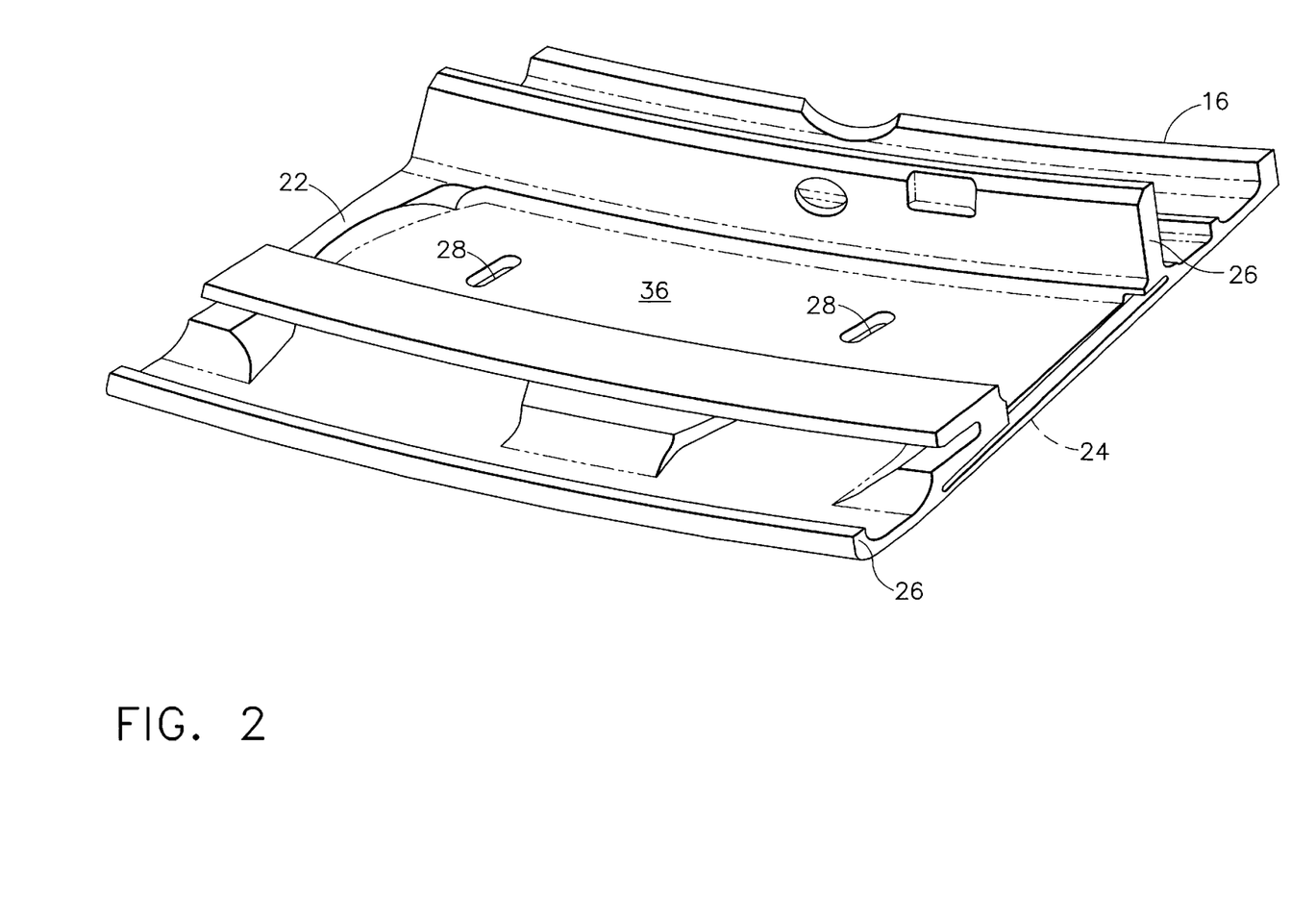
FIG. 2 is a perspective view of the inner band separated from the nozzle segment of FIG. 1.
Figure 3:
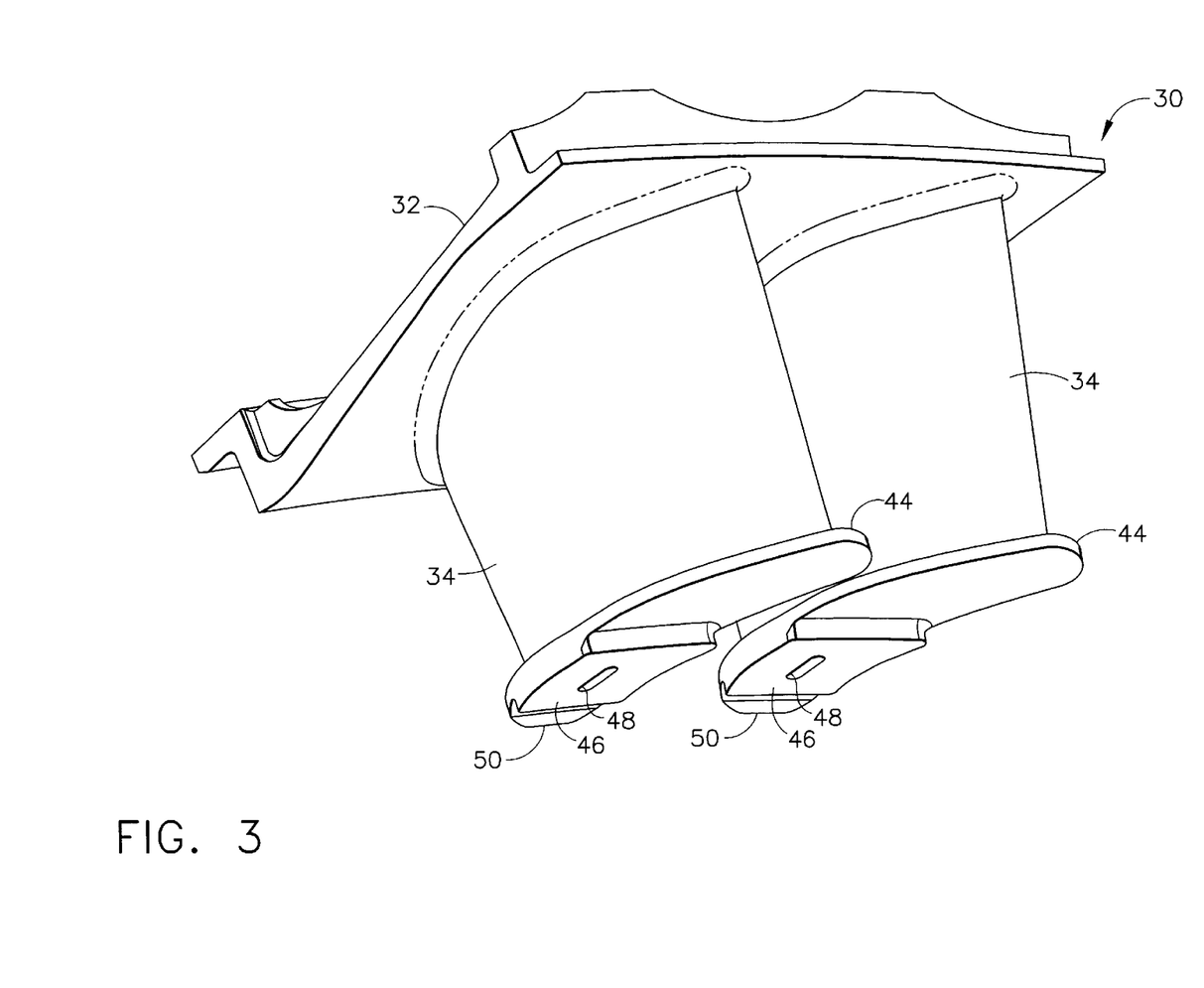
FIG. 3 is a perspective view of a replacement casting used in the repair method of the present invention.

The repair method includes the principal steps of separating the inner band 16 from the nozzle segment 10, and then joining the inner band 16 to a specially designed, newly manufactured casting that replaces the structure from which the inner band 16 was removed. As seen in FIG. 2, the salvageable inner band 16, has a cold side 22 (the side facing away from the hot gas flowpath) and a hot side 24 (the side facing the hot gas flowpath), and includes conventional structure such as flanges 26 and dump holes 28. The flanges 26 provide structural support to the inner band 16 and also provide a sealing function when the nozzle segment 10 is installed in an engine. The dump holes 28 are the means by which cooling air exits the internal cooling passages of the vanes 12 when the nozzle segment is intact. FIG. 3 shows one of the newly manufactured castings, which is hereinafter referred to as the replacement casting 30. The replacement casting 30, which is described in more detail below, is an integrally cast piece having an outer band 32 and two vanes 34.

More specifically, the initial step of the repair method is to inspect engine run nozzle segments returned from the field for servicing to identify such segments 10 that have a repairable inner band 16, while other nozzle segment structure is non-repairable. Once a suitable nozzle segment 10 has been identified, it should be stripped of any coating materials (such as corrosion or thermal resistant coatings) that may be present. The coating material may be stripped using any suitable technique, such as grit blasting, chemical baths, and the like, or by a combination of such techniques. The next step is to repair cracks in the inner band 16 and perform dimensional build-up of the flanges 26, using known repair techniques such as alloy brazing, alloy build up, welding and the like. These conventional repairs will be carried out as needed depending on the condition of the inner band 16. Any corrosion or thermal coatings that were originally used are not reapplied at this time.

Next, the inner band 16 is prepared for joining to the replacement casting 30. The first step in the inner band preparation is to machine an arcuate shaped pocket 36 into the inner band cold side 22 as shown in FIG. 2. The pocket 36 is formed around the dump holes 28 and is relatively shallow. The dump holes 28 or other datum locating features of the nozzle segment 10 can be used to position the tool used to machine the pocket 36.

Figure 4:
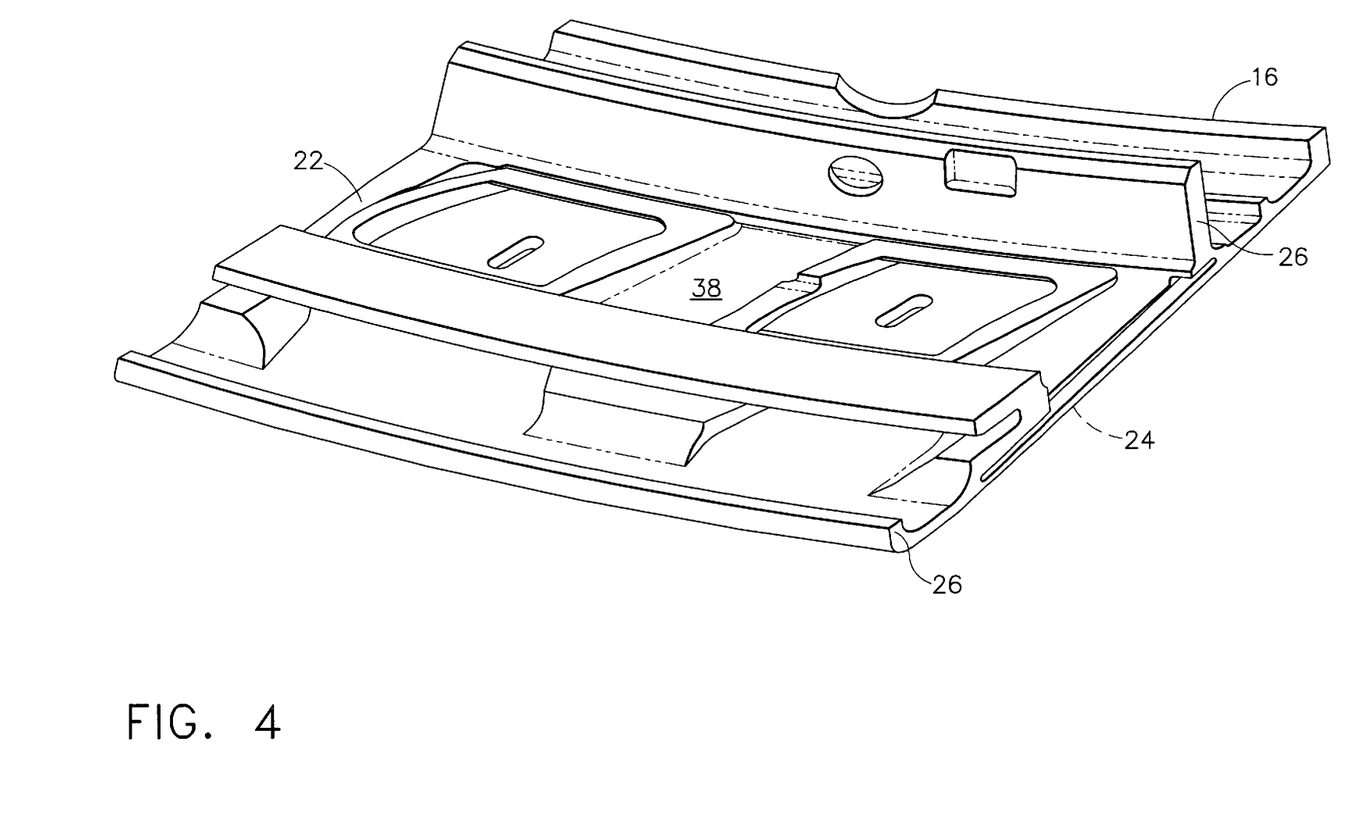
FIG. 4 is a perspective view of the inner band of FIG. 2 having a collar attached thereto.

The next step is to tack weld a collar 38 to the pocket 36 as shown in FIG. 4. The collar 38 is a block of particular dimensions and having a surface that interfaces with the pocket 36. Thus, the pocket 36 is provided to facilitate seating of the collar 38 on the contoured cold side 22 of the inner band 16. The collar 38 is preferably made of the same or similar material as the inner band 16 or at least of a material that is compatible for joining to the inner band 16 and the replacement casting 30. Joining the collar 38 to the inner band 16 before the rest of the nozzle segment 10 is removed provides support to the inner band 16 while the machining and joining operations described above take place, avoids warping or distortion during the tack welding process, and simplifies the tooling requirements for holding the inner band 16.

Figure 6:
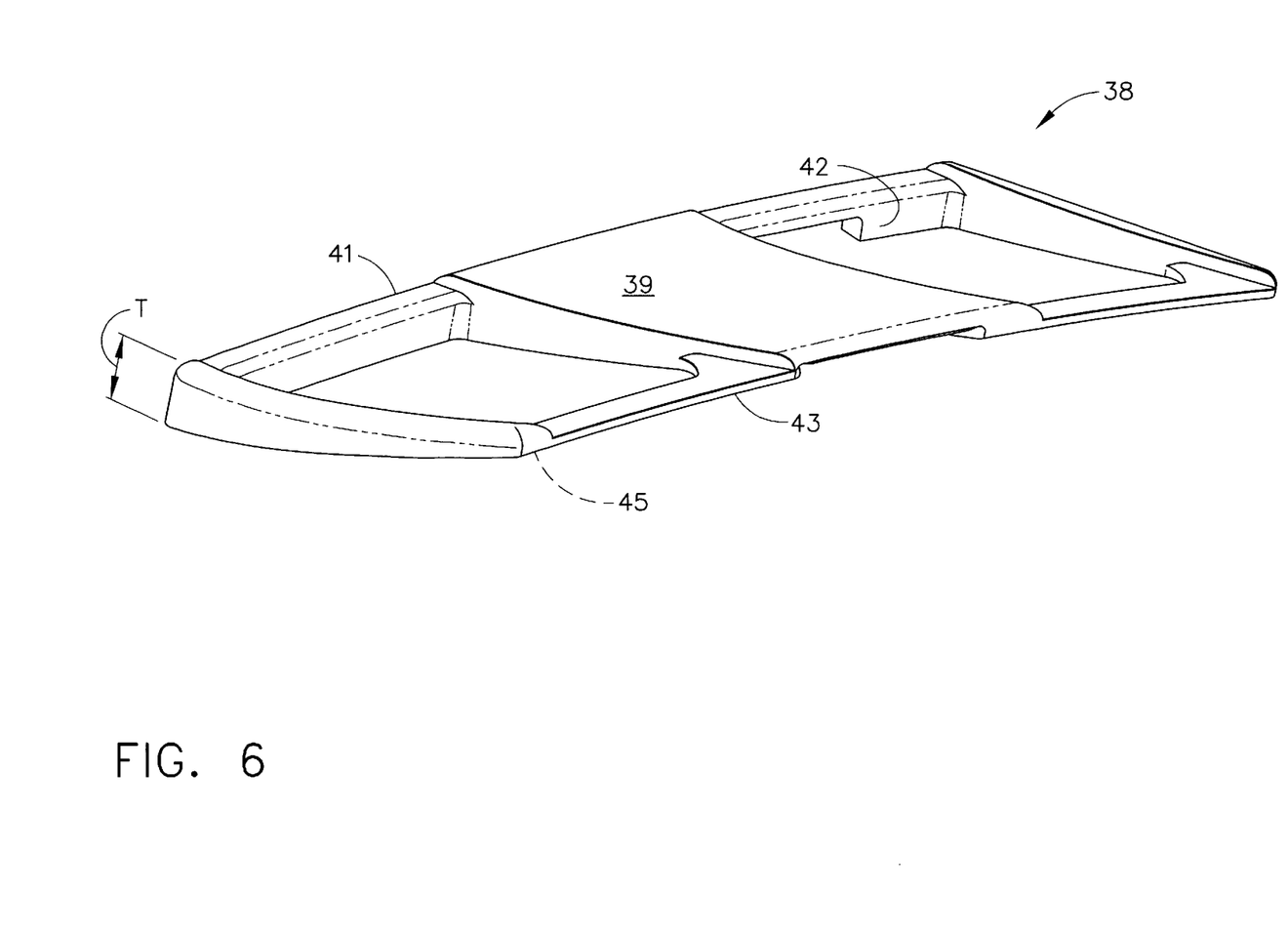
FIG. 6 is a perspective view of an exemplary collar for use with the present invention.

The collar 38 is seen in more detail in FIG. 6. The collar 38 is generally arcuate in shape to match the curve of the inner band 16, and has a radially outer surface 39 that mates with the cold side 22 of the inner band 16, and a radially inner surface 45. Receiving slots 42, one for each vane 34 of the replacement casting 30, are formed in the collar 38. The receiving slots 42 serve to receive and align the radially inner ends of the vanes 34 of the replacement casting 30, described in detail below. In the illustrated example two receiving slots 42 are shown. The receiving slots 42 may be initially formed to smaller than their final dimensions and then machined as described below. The collar 38 has a thickness, denoted T, measured in the radial direction. The thickness T is chosen to provide an adequate surface area for brazing the replacement casting 30 to the inner band 16. In the present invention, the collar 38 incorporates a taper in the axial (longitudinal) direction. That is, the thickness T of the collar 38 is different at its axially forward end 41 than at is axially aft end 43. In the specific example shown, the thickness T is greatest at the axially forward end 41 and decreases towards the axially aft end 43. This taper, in conjunction with other features described below, allows the collar 38 to be used to support the joint of the replacement casting 30 to the inner band 16 while retaining adequate clearance between the inner band 16 and the adjacent components of the engine (not shown) when the repaired nozzle segment is installed.

The next step is to separate the inner band 16 from the rest of the nozzle segment 10. Separation is accomplished by rough cutting through both vanes 12 near the inner band 16. The cutting can be performed by any conventional means such as an abrasive cutting wheel or non-conventional means such as electrical discharge machining. After separation, the unsalvageable structure is scrapped.

Figure 5:
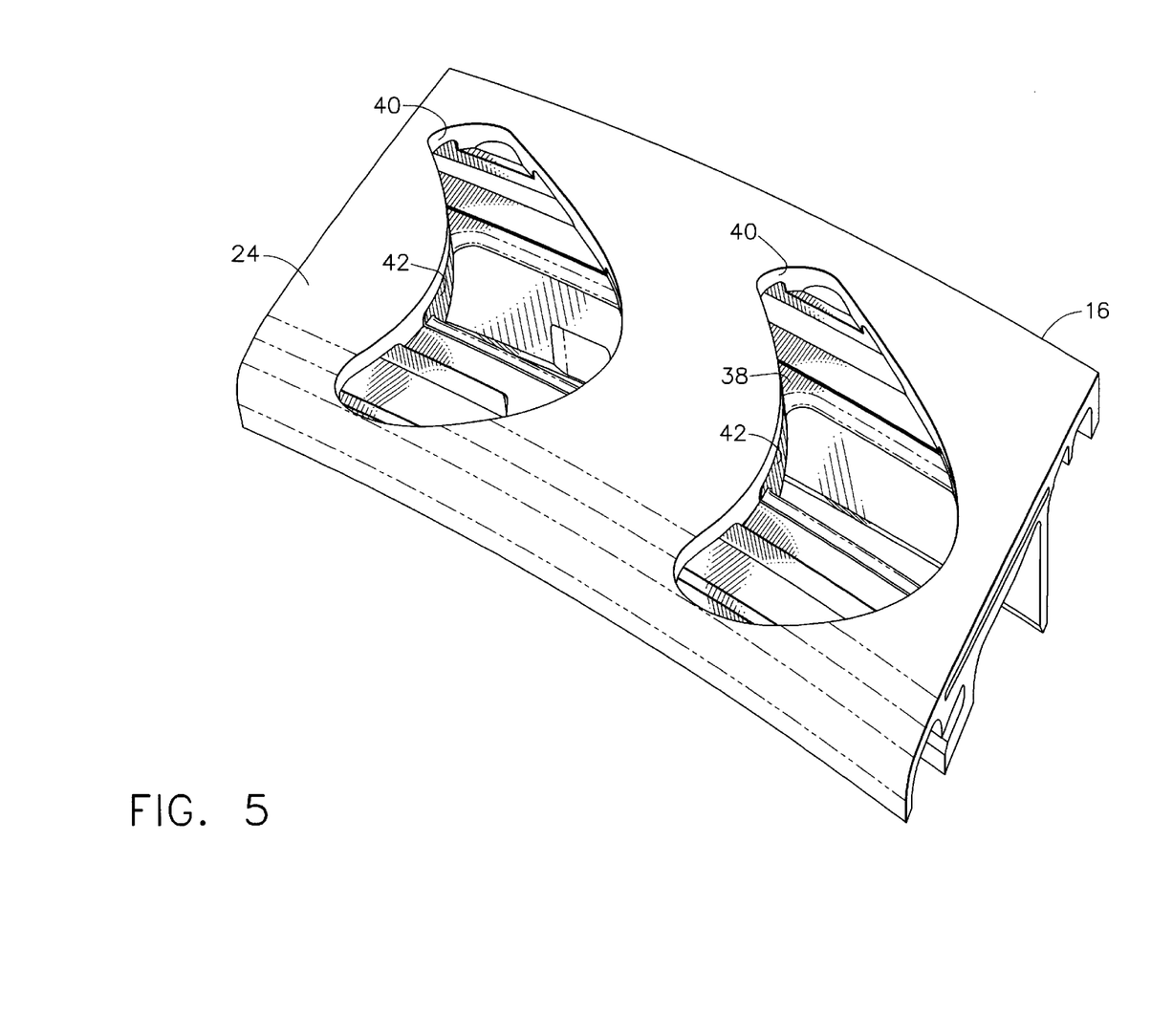
FIG. 5 is a perspective view of the inner band of FIG. 4 after machining thereof.

Referring now to FIG. 5, the inner band 16 undergoes two machining operations. In the first operation, two recesses 40 are formed in the hot side 24 of the inner band 16. The perimeter of the recesses 40 approximates the airfoil contour of the vanes 34. One preferred manner of forming the airfoil shaped recesses 40 is to plunge electrical discharge machine (EDM) each recess 40. This is accomplished using an EDM electrode having the airfoil shape. The electrode is plunged only to a depth that removes the flow path wall and does not plunge into the support flanges 26. However, the recesses 40 will break through a significant portion of the inner band 16 at several locations, as can be seen in FIG. 5. The collar 38 is wider than the recesses 40 such that it overhangs the inner band structure and cannot pass through the open portions of the recesses 40.

The dump holes 28 or other datum locating features of the nozzle segment 10 can be used again to position the EDM electrode for the EDM plunge operations. The EDM plunges for the two recesses 40 can occur along two non-parallel axes or along parallel axes. Because a turbine nozzle comprises nozzle segments arranged in an annular array, all of the vanes define radial axes that converge to the engine's centerline axis and are thus not parallel. By machining the recesses 40 along plunge axes that correspond to the radial axes of the respective vanes 34 of the replacement casting 30, each recess is oriented so that the respective vane 34 can be properly seated therein. However, the EDM plunges for the two recesses 40 can be also be done on parallel axes if the recesses 40 and the receiving slots 42 in the collar 38 are machined in the combined machining operation described below.

In the second machining operation, the receiving slots 42 in the collar 38 are machined to their final dimensions. The receiving slots 42 extend radially through the collar 38 and are generally aligned with the location of the dump holes 28, which are removed during the machining operations. The receiving slots 42 can also be formed to their final dimensions by plunge EDM. In this case, both receiving slots 42 are formed on parallel axes. This can be accomplished in a single operation using dual electrodes of appropriate shape. The receiving slots 42 are parallel to permit installation of the replacement casting 30, which is described in more detail below. This second machining operation may be combined with the first machining operation described above by using a tool or combination of tools which represent the combined profiles of the recesses 40 and the receiving slots 42 mounted to a tool holder. If the machining steps are combined in this manner then the airfoil recesses 40 and the receiving slots 42 are machined on parallel axes.

The replacement casting 30 also undergoes some machining operations prior to being joined to the inner band 16. Referring again to FIG. 3, it is seen that the replacement casting 30 is an integrally cast piece having an outer band 32 and two vanes 34. The outer band 32 and vanes 34 are the same as those on a complete nozzle segment 10, including the same internal cooling passages. However, instead of an inner band, the replacement casting 30 has a mounting platform 44 integrally formed on the radially inner end of each vane 34. A fillet is formed at the intersection of each mounting platform 44 and vane 34 to reduce stresses. Each mounting platform 44 has a raised boss 46 integrally formed on the underside thereof. A dump hole 48 is formed in each boss 46.

As is known in the art, complete, integrally cast nozzle segments, such as the nozzle segment 10, have three primary datum points, one of which is formed on the inner band. These primary datum points are used to inspect the nozzle segment for qualification purposes. Accordingly, the replacement casting 30 is cast with a small flat or datum surface 50 formed in the edge of each mounting platform 44, at the front thereof. One of the small flats 50 functions as the third primary datum point enabling the replacement casting 30 to be inspected and qualified.

Figure 7:
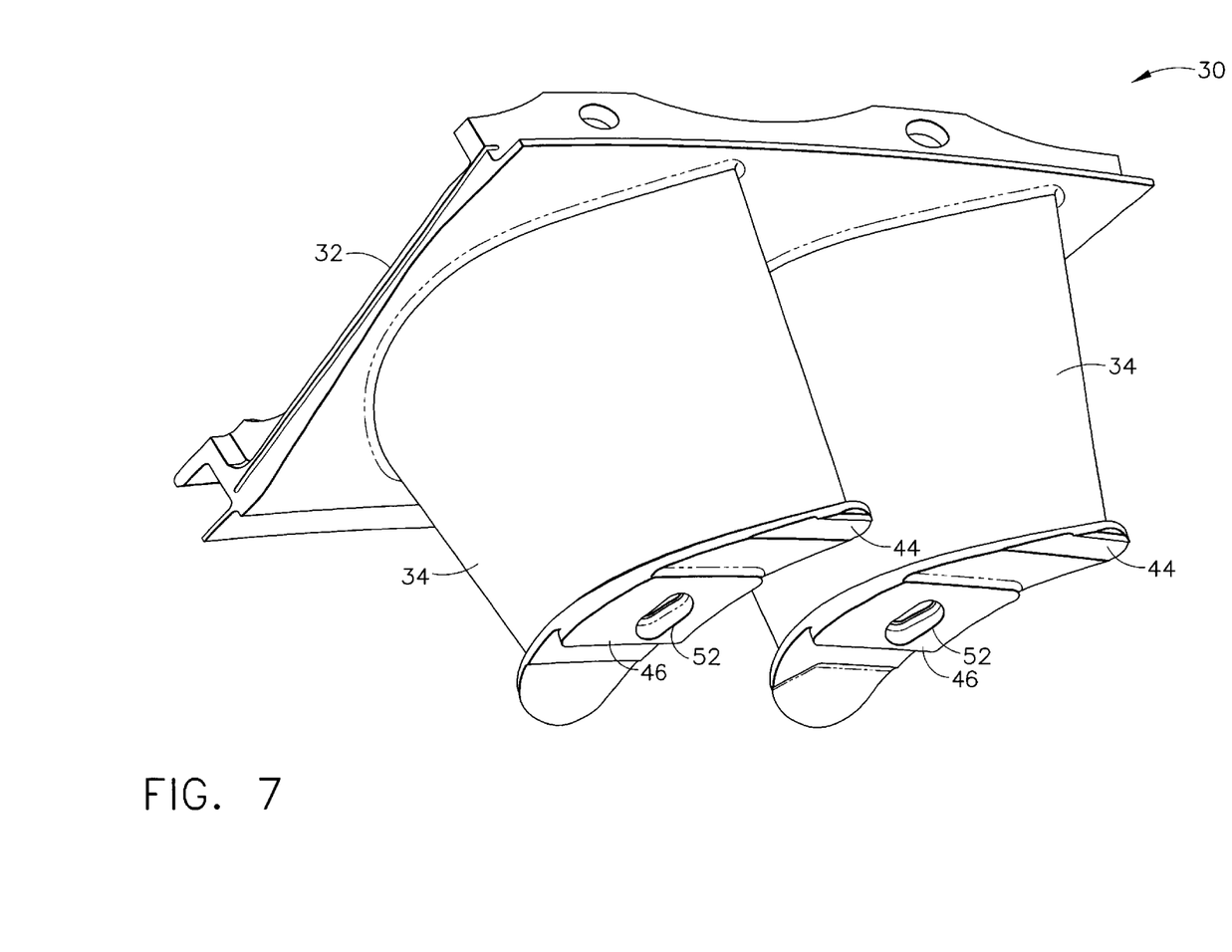
FIG. 7 is a perspective view of the replacement casting of FIG. 3 after machining thereof.

The mounting platforms 44 have approximately the same shape as the airfoil recesses 40, but are purposely oversized. Thus, the replacement casting 30 undergoes preliminary machining, such as EDM or milling, to remove excess stock material. The surfaces that are machined are the edges and bottom surfaces of the mounting platforms 44 and the perimeters of the bosses 46. As shown in FIG. 7, the platforms 44 are sized to fit into the airfoil recesses 40, and the bosses 46 are sized to fit into the receiving slots 42. Machining the edges of the platforms 44 also removes the small flats 50, which are no longer needed after the replacement casting 30 has been qualified. All of these surfaces are machined on parallel axes for both vanes 34. Thus, the bosses 46 are oriented to be installed into the receiving slots 42, which are also machined on the same parallel axes. If the bosses 46 were machined on the radial axes of the respective vanes 34, then they could not be installed into the slots 42 because the converging surfaces would bind given the height of the bosses 46. The mounting platforms 44, which have a significantly smaller depth than the bosses 46, are received in the airfoil recesses 40.

Also, dump hole pockets 52 are formed into the lower portions of the dump holes 48. The pockets 52 have a shape similar to the dump holes 48, but have larger lateral dimensions, and extend only partially through the combined thickness of the boss 46 and the platform 44, whereas the dump holes 48 extend completely through to the interior of the hollow vane 34. The pockets 52 are formed to a cross-sectional area and a depth that will retain the flow and velocity of cooling air exiting the respective vane 34 via the dump hole 48. That is, the dump hole pockets 52 are sized so that the cooling air flow and velocity will be the same as they were in the original nozzle segment 10 (which lacked the bosses 46 of the replacement casting 30). The pockets 52 may be formed by plunge EDM, along the radial axis of the respective vane 34. However, the dump hole pockets may also be integrally cast into the replacement casting 30, so that no separate machining step is required.

Figure 8:
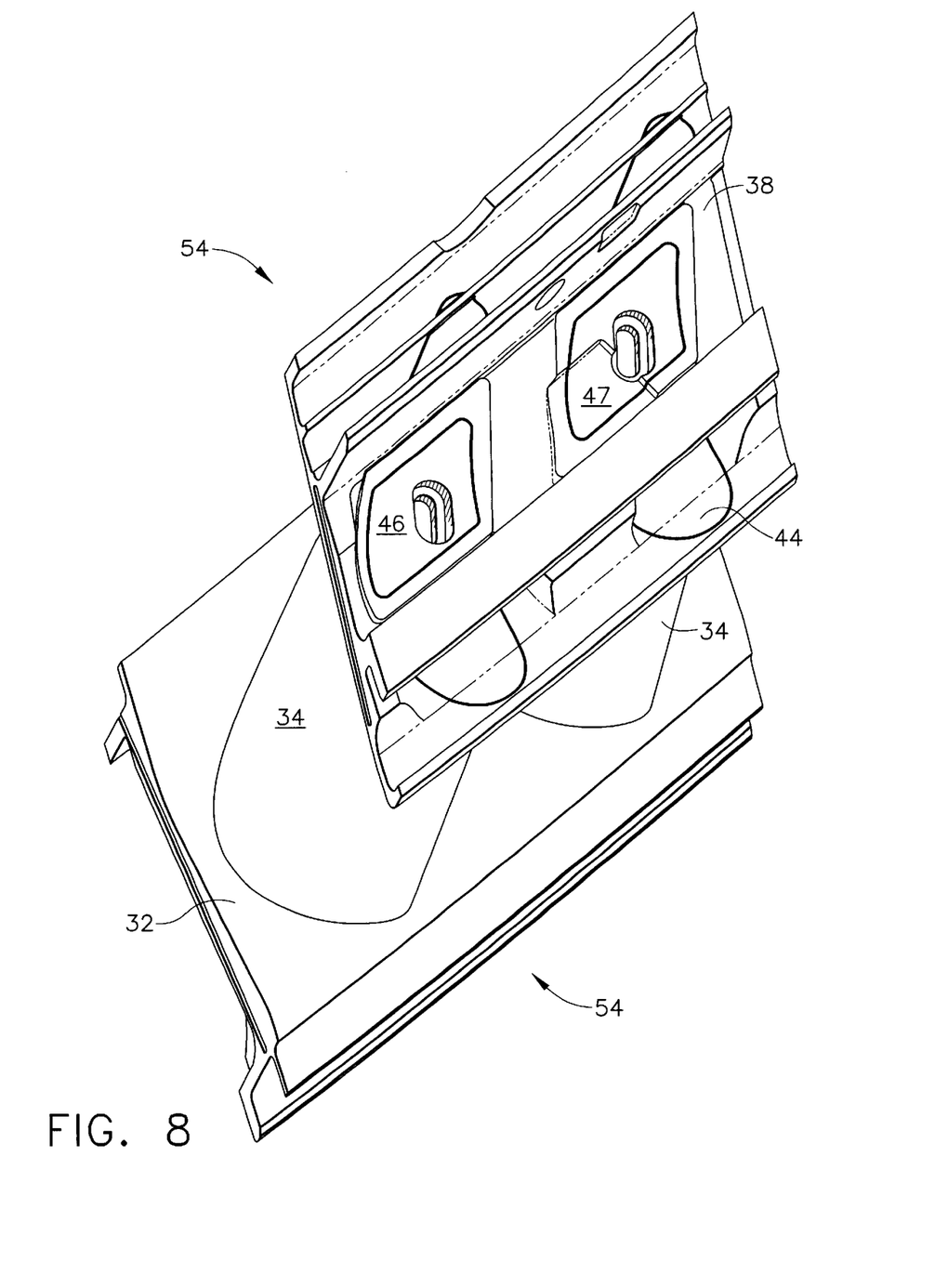
FIG. 8 is a perspective view of a repaired turbine nozzle segment.

After the machining operations are completed the inner band 16 and the replacement casting 30 are assembled to form a repaired nozzle segment 54 shown in FIG. 8. As indicated above, the inner band 16 and the replacement casting 30 are assembled by installing the mounting platforms 44 into the corresponding airfoil recess 40 and the bosses 46 into the corresponding receiving slots 42. The parts are then joined together by bonding along the following interfaces: the mounting platform-inner band interfaces on the inner band hot side 24, the collar-boss interfaces, and the collar-inner band interface on the inner band cold side 22. Bonding may be accomplished in a conventional manner such as brazing or welding although brazing is generally preferred given the thermal gradients that the part will be exposed to during engine operation. One preferred joining operation would be to first tack weld the collar 38 to the boss 46. The next step would be to apply braze alloy to the mounting platform-inner band interfaces. On the cold side 22, braze alloy is applied to collar-boss and collar-inner band interfaces. The assembly is then placed in a furnace, positioned with the inner band 16 up, and brazed.

Figure 9:
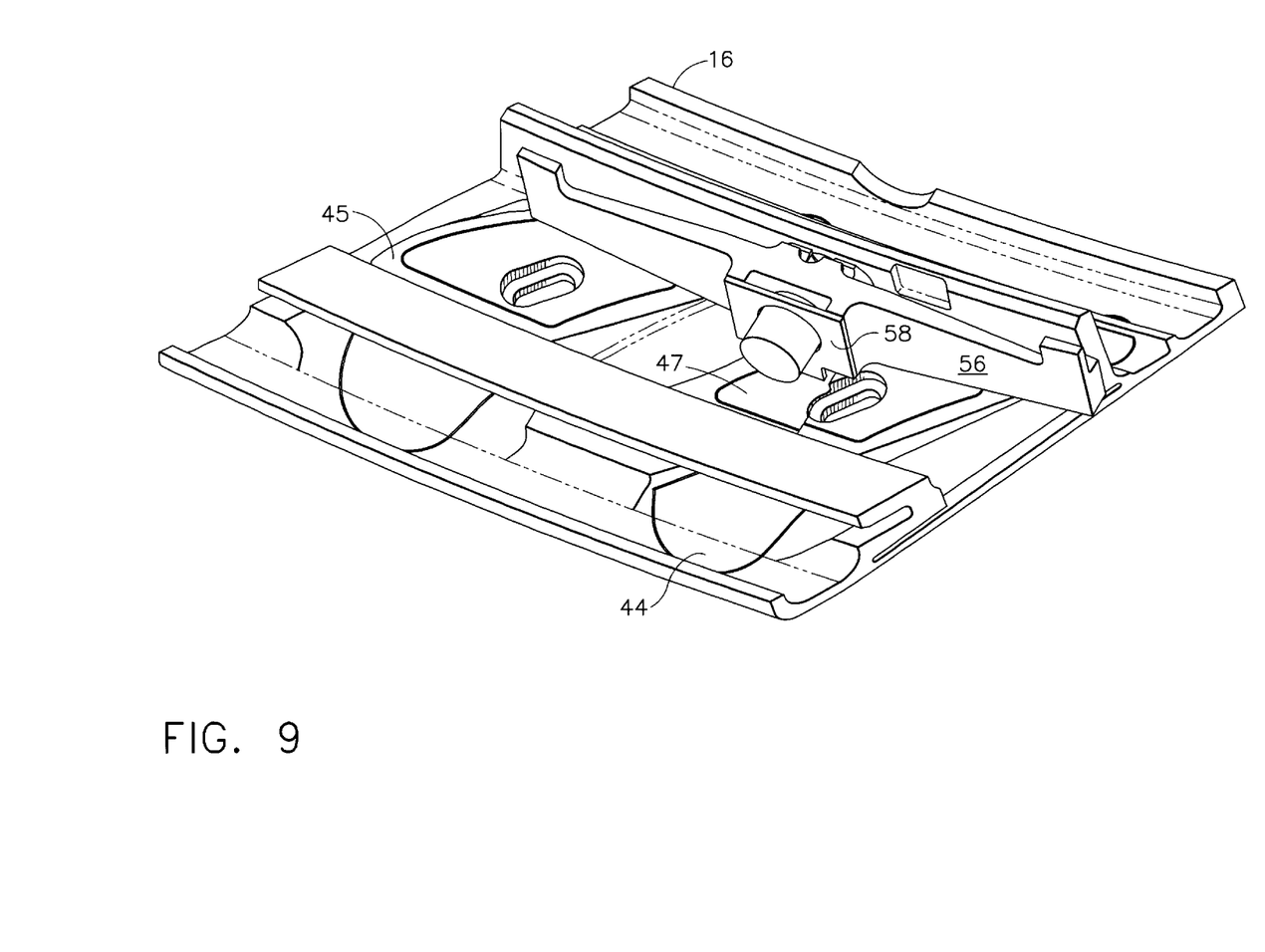
FIG. 9 is an enlarged perspective view of the inner band of a repaired turbine nozzle segment of FIG. 8.

After the braze cycle, machining operations are performed on the collar 38 to provide the required clearance to the adjacent engine components (not shown). The radially inner surface 45 of the collar 38 is machined in an arc having its center around the engine centerline, generally similar to the arc of the inner band 16. This arcuate shape is seen in FIG. 3. Also, a relief 47 is machined in the collar 38 and a portion of the boss 46 of one of the vanes 34 (see FIG. 8). This relief 47 is a shallow groove or pocket which provides clearance for adjacent components that would otherwise interfere with the collar 38 (for example a nozzle retainer 56 having a protruding feature 58, as shown in FIG. 9). These machining operations are performed after the braze operation described above to avoid discontinuities in the joined surfaces, but they could also be done before the joining operation.

Lastly, any corrosion or thermal coatings that were originally used are reapplied in a known manner. The result is a repaired nozzle segment 54 having a previously used section (corresponding to the inner band 16) and a newly manufactured section (corresponding to the replacement casting 30). The collar 38 provides structural reinforcement to the nozzle segment 54. It also provides a secondary retention feature. That is, if the mounting platform-inner band bond fails, then the collar 38 would prevent the vanes 34 from separating from the inner band 16 because the collar overhang prevents the collar 38 from being pulled through the inner band 16.

In one embodiment, the replacement casting 30 is fabricated from the same material as the inner band 16 to produce a repaired nozzle segment 54 that retains the material properties of the original nozzle segment 10. However, in another embodiment, the replacement casting 30 is fabricated from a different material, preferably an alloy having enhanced material properties. It is often the case that during the service life of a gas turbine engine component such as a nozzle segment, improved alloys suitable for use with such components are developed. Traditionally, engine operators would have to replace existing components with new components fabricated from the improved alloy to realize the enhanced material properties. However, by fabricating the replacement casting 30 from the improved alloy, the repaired nozzle segment 54 will obtain, in part, the enhanced material properties.

The replacement casting 30 may also have modified design features compared to the original nozzle segment 10. As with the alloys described above, it is often the case that during the service life of a gas turbine engine component such as a nozzle segment, improved component designs are developed. For example, nozzle segment 10 may comprise a first design having particular aerodynamic, thermodynamic, and mechanical aspects. For example, the outer band 14 may be uncooled and the vanes 12 may be formed according to a first airfoil definition which incorporates a first trailing edge cooling arrangement (i.e. the configuration of slots, holes, and internal passages which direct pressurized cooling air to the trailing edge of the vane 12). The replacement casting 30 may comprise a modified design. The modified design may include an outer band film having cooling holes of a known type formed therein, and may also include a second trailing edge cooling design of a known type, which has a different arrangement of slots, holes, and internal casting features that the first trailing edge cooling arrangement, and which is intended to provide improved cooling performance relative to the first trailing edge cooling arrangement. The aerodynamic design of the vane 34 may also be modified to improve its performance. This embodiment of the present invention produces a repaired nozzle segment 54 that obtains the benefit of improved component design features without having to replace the entire nozzle segment. This aspect of the present invention may also be combined with the improved alloys described above. That is, the original nozzle segment 10 may incorporate a first alloy and a first design, while the replacement casting 30 may incorporate modified design features and may be constructed of an alloy having enhanced material properties.

While specific embodiments of the present invention have been described, it will be apparent to those skilled in the art that various modifications thereto can be made without departing from the spirit and scope of the invention as defined in the appended claims.

What is claimed is:

1. A method of repairing a turbine nozzle segment having at least one vane disposed between outer and inner bands, said method comprising:

separating said inner band from said nozzle segment;

repairing damage in said inner band; and joining said inner band to a newly manufactured replacement casting having an outer band and at least one vane;

wherein joining said inner band to said newly manufactured replacement casting includes:

joining a collar to said inner band, said collar having a receiving slot formed therein and being tapered so as to have a greater thickness at a first axial end thereof than at a second axial end thereof;

inserting a portion of said vane of said replacement casting into said receiving slot; and joining said vane of said replacement casting to said collar and to said inner band.

2. The method of claim 1 wherein said thickness of said collar is greatest at an axially forward end thereof.

3. The method of claim 1 further comprising machining a radially inner surface of said collar to from a circumferentially extending arcuate surface.

4. The method of claim 1 further comprising forming a pocket in said inner band, said collar being joined to said inner band at said pocket.

5. The method of claim 1 wherein said collar is joined to said inner band and said vane of said replacement casting is joined to said collar and to said inner band by brazing.

6. The method of claim 1 wherein separating said inner band from said nozzle segment comprises cutting through said vane of said nozzle segment near said inner band.

7. The method of claim 1 wherein said replacement casting is fabricated from the same material as said inner band.

8. The method of claim 1 wherein said replacement casting is fabricated from a material that has enhanced material properties with respect to the material that said inner band is fabricated from.

9. The method of claim 1 further comprising machining a relief in a radially inner surface of said collar.

10. The method of claim 1 wherein said vanes of said nozzle segment have a first design and said vanes of said replacement casting have a modified design.

11. The method of claim 10 wherein said vanes of said nozzle segment have a first trailing edge cooling configuration and said vanes of said replacement casting have a modified trailing edge cooling configuration.

12. The method of claim 1 wherein said outer band of said nozzle segment is uncooled and wherein said outer band of said replacement casting includes a plurality of film cooling holes formed therein.

13. A method of repairing a turbine nozzle segment having one or more vanes disposed between outer and inner bands, said method comprising:

separating said inner band from said nozzle segment;

providing a newly manufactured replacement casting having an outer band and one or more vanes, each vane of said replacement casting having a mounting platform formed on one end thereof and a boss formed on said mounting platform;

joining a collar to one side of said inner band, said collar having a thickness that is greater at a first axial end thereof than at a second axial end thereof;

forming one recess for each vane of said replacement casting in another side of said inner band;

forming one receiving slot for each vane of said replacement casting in said collar;

for each vane of said replacement casting, inserting said boss into said corresponding slot and said mounting platform into said corresponding recess; and for each vane of said replacement casting, joining said boss to said collar and said mounting platform to said inner band.

14. The method of claim 13 further comprising forming a pocket in said inner band for said collar, said collar being joined to said inner band at said pocket.

15. The method of claim 13 wherein said collar is joined to said inner band, each boss is joined to said collar, and each mounting platform is joined to said inner band by brazing.

16. The method of claim 13 further comprising, for each vane of said replacement casting, machining said boss and said mounting platform to size prior to inserting into said corresponding receiving slot and said corresponding recess, respectively.

17. The method of claim 13 further comprising providing a dump hole in each boss.

18. The method of claim 13 wherein each boss has a dump hole pocket integrally cast therein.

19. The method of claim 13 further comprising machining a relief in a radially inner surface of said collar.

20. The method of claim 13 wherein separating said inner band from said nozzle segment comprises cutting through each vane of said nozzle segment near said inner band.

21. The method of claim 13 further comprising the step of repairing damage in said inner band.

22. The method of claim 13 wherein said replacement casting is fabricated from the same material as said inner band.

23. The method of claim 13 wherein said replacement casting is fabricated from a material that has enhanced material properties with respect to the material that said inner band is fabricated from.

24. The method of claim 13 wherein said replacement casting has at least two of said vanes and all of said slots are machined on parallel axes.

25. The method of claim 13 wherein said replacement casting has a fillet formed between each vane and said corresponding mounting platform.

26. The method of claim 13 wherein said vanes of said nozzle segment have a first design and said vanes of said replacement casting have a modified design.

27. The method of claim 26 wherein said vanes of said nozzle segment have a first trailing edge cooling configuration and said vanes of said replacement casting have a modified trailing edge cooling configuration.

28. The method of claim 13 wherein said outer band of said nozzle segment is uncooled and wherein said outer band of said replacement casting includes a plurality of film cooling holes formed therein.

29. A turbine nozzle segment comprising:

an inner band; and a replacement casting including an outer band and at least one vane disposed between said outer and inner bands, wherein said inner band is previously used and repaired structure and said replacement casting is newly manufactured structure, said turbine nozzle segment comprising a collar attached to a cold side of said inner band, the thickness of said collar being tapered in an axial direction.

30. The turbine nozzle segment of claim 29 wherein a relief is formed in said collar and said vane.

31. The turbine nozzle segment of claim 29 wherein a radially inner surface of said collar defines a circumferentially extending arcuate surface.

32. The turbine nozzle segment of claim 29 wherein said inner band and said replacement casting are fabricated from the same material.

33. The turbine nozzle segment of claim 29 wherein said replacement casting is fabricated from a material that has enhanced material properties with respect to the material that said inner band is fabricated from.

34. the turbine nozzle segment of claim 29 wherein each vane of said replacement casting has a mounting platform formed on one end thereof and a boss formed on said mounting platform, and a dump hole pocket is integrally cast into each of said bosses.

\* \* \* \* \*

UNITED STATES PATENT AND TRADEMARK OFFICE
CERTIFICATE OF CORRECTION

| | |
|---|---|
| PATENT NO. | : 6,793,457 B2 |
| DATED | : September 21, 2004 |
| INVENTOR(S) | : Caddell et al. |

Page 1 of 1

It is certified that error appears in the above-identified patent and that said Letters Patent is hereby corrected as shown below:

<u>Column 8,</u>
Line 33, delete "from" and insert -- form --.

<u>Column 10,</u>
Line 42, delete "the" and insert -- The --.

Signed and Sealed this

Seventh Day of March, 2006

JON W. DUDAS
*Director of the United States Patent and Trademark Office*